United States Patent [19]

Fitzsimmons et al.

[11] 4,360,741
[45] Nov. 23, 1982

[54] COMBINED ANTENNA-RECTIFIER ARRAYS FOR POWER DISTRIBUTION SYSTEMS

[75] Inventors: George W. Fitzsimmons, Lynnwood; Walter W. Lund, Jr., Seattle; Ervin J. Nalos, Bellevue, all of Wash.

[73] Assignee: The Boeing Company, Seattle, Wash.

[21] Appl. No.: 194,123

[22] Filed: Oct. 6, 1980

[51] Int. Cl.³ .............................................. H02M 7/00
[52] U.S. Cl. ...................................... 307/151; 363/13
[58] Field of Search ................... 322/2; 310/4, 300; 307/149, 151; 363/13; 343/846

[56] References Cited

U.S. PATENT DOCUMENTS

| | | | |
|---|---|---|---|
| 3,434,678 | 3/1969 | Brown et al. | 244/1 |
| 3,535,543 | 10/1970 | Dailey | 307/149 |
| 3,587,110 | 6/1971 | Woodward | 343/813 |
| 3,757,342 | 9/1973 | Jasik et al. | 343/738 |
| 3,760,257 | 9/1973 | Fletcher et al. | 321/1.5 |
| 3,781,647 | 12/1973 | Glaser | 322/2 R |
| 3,795,910 | 3/1974 | Robinson, Jr. | 343/7.5 |
| 3,852,755 | 12/1974 | Works et al. | 343/701 |
| 3,887,925 | 6/1975 | Ranghelli et al. | 343/795 |
| 3,921,177 | 11/1975 | Munson | 343/846 |
| 4,054,874 | 10/1977 | Oltman, Jr. | 343/700 MS |
| 4,071,846 | 1/1978 | Oltman, Jr. | 343/700 MS |
| 4,072,951 | 2/1978 | Kaloi | 343/700 MS |
| 4,078,237 | 3/1978 | Kaloi | 343/700 MS |
| 4,079,268 | 3/1978 | Fletcher et al. | 307/151 |
| 4,083,046 | 4/1978 | Kaloi | 343/700 MS |
| 4,251,679 | 2/1981 | Zwan | 322/2 R |

OTHER PUBLICATIONS

Denman, et al., "A Microwave Power Transmission System for Space Satellite Power," 20-25 Aug. 1978, pp. 162-168, Conference: Proceedings of the 13th Intersociety Energy Conversion Engineering Conf., San Diego, Ca., USA.

*Primary Examiner*—William H. Beha, Jr.
*Attorney, Agent, or Firm*—Christensen, O'Connor, Johnson & Kindness

[57] ABSTRACT

An electrical power distribution system wherein electromagnetic energy irradiates a large spatial area is configured to include an array of antenna-rectifier modules wherein the receive aperture of each module is established in accordance with the electromagnetic field intensity at the location of that particular module so as to provide the rectifier circuitry with a predetermined amount of electrical power. Each antenna-rectifier module includes an array of high impedance (e.g., antiresonant) dipoles that are spaced apart along a two-wire transmission line. The total number of dipoles employed is established to provide the desired receive aperture and the impedance of each dipole is established so that the total impedance of the array substantially matches that of the rectifier circuitry employed. The rectifier circuitry is enclosed in and electromagnetically shielded by a conductive housing that is removably interconnected with the array of antenna elements and first and second filtering circuits are included to respectively eliminate high frequency signal components that can be coupled to and radiated by the antenna structure and high frequency ripple within the DC output signal.

18 Claims, 4 Drawing Figures

COMBINED ANTENNA-RECTIFIER ARRAYS FOR POWER DISTRIBUTION SYSTEMS

BACKGROUND OF THE INVENTION

This invention relates to the transmission of electrical power over substantial distances wherein energy is transmitted through the atmosphere as a high frequency electromagnetic wave. More specifically, this invention relates to combined antenna and rectifier structure for receiving high frequency electromagnetic energy and converting the received high frequency energy to a direct current (DC) electrical signal suitable for use in conventional distribution grids and/or other apparatus that requires electrical energy.

Various proposals have been presented for the transmission of energy between a source and a remote location that requires such energy wherein the energy is converted to a radio frequency signal that is transmitted as an electromagnetic wave and received at the remote location. Because of efficiency considerations, the frequency of the transmitted signal of such a system is generally in the microwave region and is converted to a low frequency or direct current signal that is more amenable for use with conventional energy storage apparatus (e.g., batteries) and a wide variety of conventional electrically powered apparatus at the receiving station. Examples of proposed power distribution systems of this type include those intended to supply energy to remote facilities located on the surface of the earth; those intended to, in effect, beam energy from earth to airborne vehicles, including conventional aircraft space vehicles and satellites; and those intended to distribute power from a large master space satellite or "mother-ship" to smaller subsatellites.

Although advances in the state of the art relative to other types of power distribution systems have provided more satisfactory alternative means for accomplishing each of the above-mentioned goals, the need to obtain energy from sources other than petroleum and other nonrenewable deposits has created renewed interest in transmission of electrical power by microwave radiation. More specifically, one proposal under consideration is the use of a synchronous satellite for collecting solar energy wherein the satellite also includes means for converting direct current electrical energy provided by solar cells into high frequency electromagnetic waves that are retransmitted and beamed to the earth. This technique has several advantages over converting solar energy that is received at the surface of the earth into electrical energy. For example, the electromagnetic energy provided by such a satellite can supply energy to the earth that is not limited to normal daylight hours. Of perhaps even greater importance, the electromagnetic energy is subjected to far less attenuation than the light and heat content of solar energy that propagates through the earth's atmosphere, including substantial cloud cover that frequently blankets various portions of the earth's surface.

Because of those constraints inherent to all applications in which power is to be transferred between remotely located points through transmission of microwave energy and additional constraints imposed by a satellite transmission system of the above-mentioned type, a need arises for specially structured receiving arrangements and associated means for converting the received electromagnetic energy into a direct current electrical signal. In this regard, many of the prior art proposals have included one or more rectifiers that are associated with each antenna element that receives the electromagnetic energy. Such an arrangement would be extremely costly and complex in that even when the satellite uses the most directional antenna array possible, usable electromagnetic energy will impinge on at least several square miles of the earth's surface. To efficiently collect this energy with an array of antennas wherein one or more rectifier diodes is associated with each antenna would, of course, require an extremely large number of diodes, especially since small antennas such as half-wave dipoles have been utilized in the vast majority of the prior art arrangements.

The use of a prior art arrangement of the above-described type also presents a disadvantage or drawback in that it is not possible to achieve maximum efficiency with such an arrangement. In particular, the electromagnetic field intensity and hence the power density is not uniform throughout the irradiated region, but varies from a maximum value near the center of the irradiated region to a substantially lower value along the outer periphery thereof. In this regard, variations on the order of 10 db will often be encountered. This means that an antenna positioned in the central portion of the irradiated region will provide an electrical signal at a greater power level than will an identical antenna which is positioned a substantial distance from the central region. Since the efficiency of semiconductor rectifiers varies substantially with power level, this also means that an antenna combination that is optimized for operation in one portion of the irradiated region will not operate efficiently within a second portion of the electromagnetic field.

Another problem that is encountered in utilizing prior art arrangements in such a system is the reradiation of harmonically related energy. In this regard, it is well-known that nonlinearities in the operating characteristics of typical RF-DC diode conversion systems cause generation of electrical signals that are harmonically related in frequency to the frequency of the received electromagnetic signal. Prior art antenna-rectifier apparatus are not arranged to effectively prevent such harmonic signal components from radiating into the earth's atmosphere from the antenna elements and the associated interconnecting transmission lines. Because of the significant signal levels present within a solar power satellite system, such radiation not only constitutes a loss of energy that can potentially contribute to the DC output of the system, but can also cause other problems such as interference with various communications systems.

The problems associated with filtering the DC signal supplied by the semiconductor rectifiers can also be more significant in the type of system under consideration. For example, in accordance with most proposals, the irradiated regions are located in sparsely populated and somewhat remote areas with the rectified signal being carried to the area which will utilize the electrical power via conventional power transmission grids. Thus, AC signal components including harmonically related signals that would be conducted through and radiated from such a grid should be eliminated. As is the case with high frequency radiation from the receiving elements, the prior art does not appear to provide adequate and reliable containment of harmonic energy or prevent its radiation from the DC distribution grid.

In addition to the above-discussed disadvantages and drawbacks, the previously proposed arrangements have not achieved the ease of assembly and servicing that is necessary in a large scale system such as the above-discussed solar transmission system. In this regard, prior art proposals have often utilized an arrangement wherein the diodes are installed in substantially inaccessible portions of an associated antenna or within the dielectric region of transmission line structure leading from an antenna. Further, the relatively few attempts that have been made to install impedance matching structure between the antenna and the semiconductor rectifier or to provide signal filtering generally utilize distributed parameter networks that are located along the transmission path between the antenna and the system output terminals. Often, these previous attempts at impedance matching and filtering through use of distributed parameter networks employ components formed on the same dielectric substrate that supports the conductive antenna elements. Thus, these networks are relatively complex, are not easily serviced, cannot be fully tested or calibrated prior to final assembly and often radiate undesirable harmonic signals since they are not electromagnetically shielded.

Accordingly, it is an object of this invention to provide combined antenna-rectifier structure especially suited for use in a large scale power distribution system wherein a substantial region is radiated with microwave energy.

It is another object of this invention to provide antenna-rectifier structure that is readily adaptable for efficient operation within electromagnetic fields exhibiting substantial variation in field strength or power density.

It is yet another object of this invention to provide combined antenna-rectifier structure that includes provision for efficient impedance matching and filtering of the associated electrical signals to thereby minimize radiation from the antenna elements thereof.

It is still another object of this invention to provide a combined antenna-rectifier structure of the above-described type wherein the rectifier, impedance matching and filtering networks can be easily installed to the antenna structure and can be easily removed for replacement or servicing.

Further, another object of this invention is to provide a modular antenna-rectifier structure of the above-described type in which the RF-to-DC conversion efficiency, harmonic leakage and DC output ripple of each modular unit can be easily determined prior to incorporation of such a module into final large scale array of such modules.

SUMMARY OF THE INVENTION

These and other objects are achieved in accordance with this invention by utilization of combined antenna-rectifier modules wherein the receive aperture of each module is established in accordance with the position that module occupies within the received electromagnetic field. More specifically, in accordance with the invention, a large array of antenna-rectifier modules is utilized to receive the microwave energy transmitted from a solar satellite or other source with the receive aperture of each module being selected so that the module exhibits a predetermined electrical power capability. Since the power capability of the modules is directly proportional to the module aperture and the electromagnetic field strength at the module's location within the electromagnetically irradiated region, modules located at the central portion of the irradiated region, where the field strength and power density are maximum, are configured to exhibit a smaller aperture than are those modules located near the outer periphery of the irradiated region.

In accordance with the invention, each antenna-rectifier module includes an array of antenna elements wherein the number of antenna elements determines the receive aperture and hence the electrical power received by that module. For example, in each disclosed embodiment of the invention, the antenna elements are antiresonant dipoles which are spaced approximately one wavelength from one another along a transmission line. Depending on the receive aperture to be attained and hereinafter discussed considerations that pertain to the rectifier circuit employed, two or more groups of spaced apart dipoles can be cascade connected (parallel connected) to supply an electrical signal to the rectifier circuitry. In this regard, the prime criteria is that the high frequency electrical signal provided by the antenna arrangement exhibits a power level that is fully compatible with the rectifier being employed. More specifically, the number of antenna elements in each group of spaced apart antenna elements and the number of groups that shunt feed a single rectifier circuit are selected so that the voltage and current of the electrical signal causes the rectifier to operate at or near maximum efficiency without causing the rectifier to exceed electrical or thermal operating limits. Further, the impedance of the antenna elements and the transmission lines that interconnect the antenna elements is established to match the impedance of the rectifier circuitry as closely as possible.

In order to eliminate or at least substantially reduce reradiation of electromagnetic energy by the antenna elements while providing satisfactory filtering of the rectifier direct current signal, the rectifier circuitry of this invention includes three cascade connected circuit stages. More specifically, the high frequency electrical signal provided by the antenna elements is coupled to a filter that passes energy at the frequency of the received signal to a semiconductor rectifier stage. In each of the disclosed arrangements, the filter is of a low-pass configuration so that the harmonically related signals that are generated by the semiconductor rectifier are not coupled from the rectifier to the antenna elements. In this regard, the filter is preferably configured and arranged so that the harmonics generated by the rectifier are reflected by the low-pass filter so as to arrive at the rectifier with a phase relationship that causes such signals to contribute to the DC output signal, thereby improving the RF-to-DC conversion efficiency of the overall circuit. This same filter may also be designed to provide an impedance transformation between the several arrayed dipoles and the diode rectifier. A second low-pass filter receives the DC signal supplied by the rectifier and blocks AC signal components at the system fundamental frequency and at harmonics thereof.

In the disclosed arrangements, the two arms of each antenna element are formed on the opposite sides of a dielectric substrate by employing conventional printed circuit techniques. The transmission lines which interconnect the antenna elements and couple groups of the spaced apart antenna elements to the rectifier circuits are ribbons of conductive material that form two-conductor parallel strip transmission lines wherein the two conductors are formed on opposite sides of the dielectric substrate. The impedance of the transmission lines is established as a compromise between circuit loss and antenna system bandwidth. In particular, although a relatively high impedance line yields a wider bandwidth, such a transmission line requires relatively narrow conductors and often exhibits greater resistive signal loss then is desired. Regardless of the impedance of the interconnecting line, the impedance presented to the rectifier circuitry by the antenna array (at the system center frequency) is established substantially equal to $Z_d/n$, where n is the number of antenna elements and $Z_d$ is the characteristic impedance of each dipole antenna. To optimize the arrangement relative to receiving in a single direction, the lower surface of each antenna module is a metallic ground plane that is electrically separated from the array of antenna elements by approximately one-quarter wavelength.

To further minimize reradiation of signals that are harmonically related to the received signal, the filters and semiconductor rectifiers of the preferred embodiments in the invention are located within a conductive cylinder or sleeve that is attached to the ground plane of antenna module. In this arrangement, the conductive sleeve is electrically connected to the ground plane by means of spring contacts and the input terminal of the low-pass filter for receiving the signal supplied by the antenna elements projects outwardly from one end of the conductive cylinder. This terminal mates with a suitably arranged connector that is integrably formed in the substrate and conductive elements of the array of antenna elements.

BRIEF DESCRIPTION OF THE DRAWINGS

Other objects and advantages of the present invention will become apparent to one skilled in the art after reading the following description taken together with the accompanying drawings in which.

DETAILED DESCRIPTION

Figure 1:
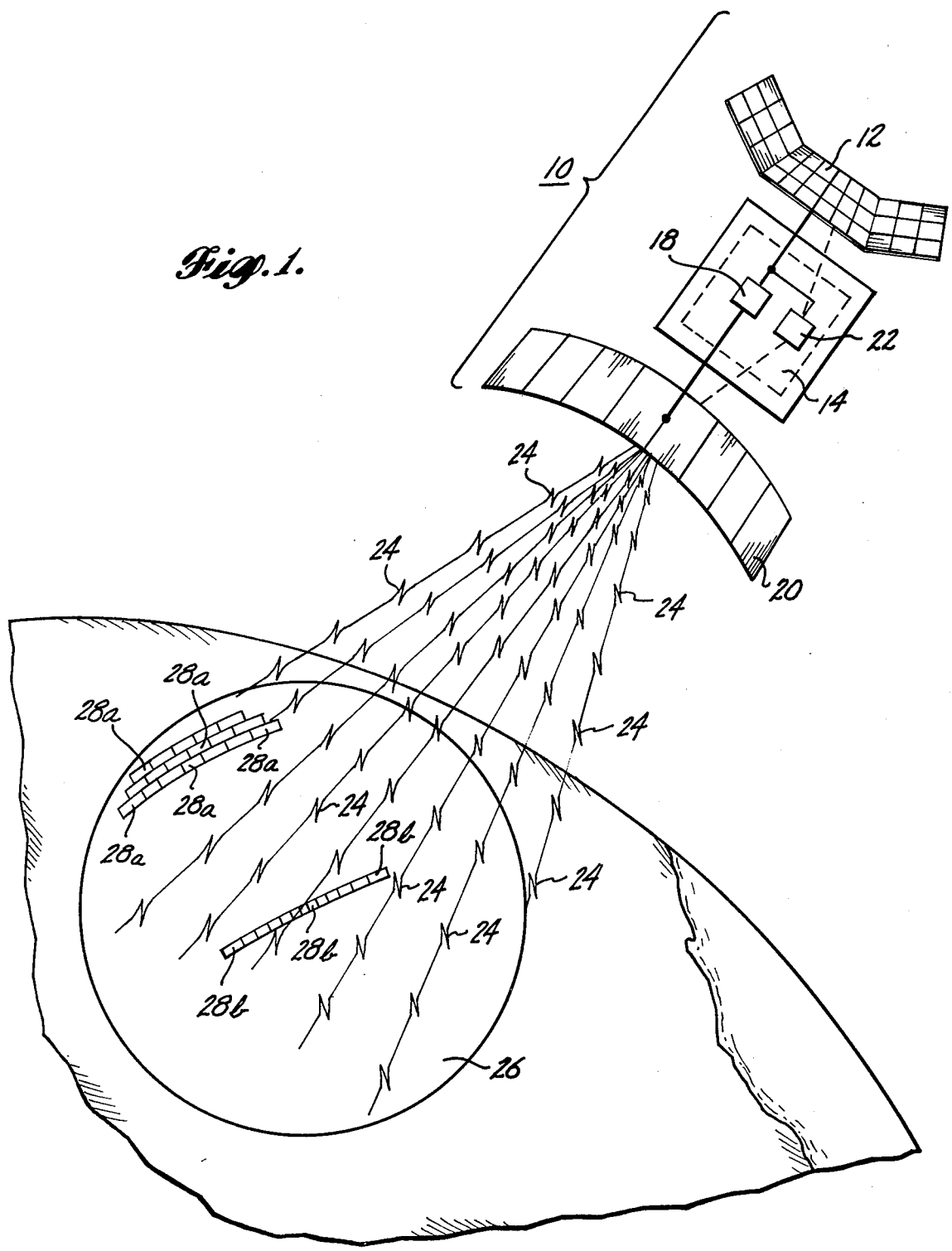
FIG. 1 diagrammatically depicts the broader aspects of the invention wherein an array of antenna-rectifier modules are arranged for receiving electromagnetic energy transmitted to the surface of the earth by a synchronous satellite which is equipped for solar to RF energy conversion.

Referring now to the drawings, wherein like numerals designate similar elements throughout the various views, FIG. 1 diagrammatically depicts a solar power system wherein a synchronous satellite 10 gathers solar energy, which is converted to electrical energy for simultaneous or subsequent transmission to earth in the form of high frequency electromagnetic radiation. As is indicated in FIG. 1, such a synchronous satellite 10 generally includes a large array of solar cells 12 which are exposed to radiant solar energy and provide a direct current electrical signal to a transmission/control module 14 that is located within the satellite 10. Although various arrangements can be utilized, transmission/control module 14 generally includes a relatively high power RF generator 18 that is powered by the solar cells 12 and supplies high frequency electrical signals to a transmitting antenna array 20. Depending on various system design objectives, various conventional transmitter arrangements can be utilized as RF generator 18, including those utilizing a large number of semiconductor devices and a lesser number of klystron tubes to provide an alternating current signal at the desired frequency and power level. In addition, transmission/control module 14 of satellite 10 preferably includes a stabilization unit 22 which is also powered by the solar cells 12 and includes means for maintaining solar cell array 12 in an orientation wherein maximum or adequate solar radiation is received and/or means for maintaining transmitting antenna 20 in an orientation wherein the electromagnetic energy that is radiated by transmitting antenna array 20 impinges on a predetermined portion of the earth's surface. In some installations, transmission/control module 14 may include energy storage devices such as batteries that are charged by solar cells 12 to facilitate continued operation during brief periods in which the solar cells 12 do not receive sufficient radiant energy.

Regardless of the exact arrangement utilized in transmission/control module 14, transmitting antenna array 20 is configured to produce a radiation pattern having an extremely narrow beam that is directed toward the surface of the earth (denoted by arrow-like lines 24 of FIG. 1). Because of the divergence of the radiation pattern provided by transmitting antenna array 20, the irradiated region 26 on the surface of the earth will typically include an area of several tens of square miles. The size of the irradiated region 26 can also be influenced by the power generating capability that is to be attained. In particular, to prevent undue heating of the ionosphere, the maximum field intensity of the electromagnetic signal provided by satellite 10 must be below a predetermined limit. The limiting of the electromagnetic field intensity within the ionosphere, in turn, places a maximum limit on the power density within the irradiated region 26. Thus, if a specified amount of power is to be made available within an irradiated region 26, the area encompassed must at least be equal to the specified total power divided by the average power density within the irradiated region.

To collect the impingent energy and convert it to a form more amenable to use within conventional transmission systems and various utilization devices, a large array of interconnected antenna-rectifier modules 28 is located within the irradiated region 26. As is described in more detail hereinafter, each of the depicted antenna-rectifer modules 28 includes an array of antenna elements that is coupled to a rectifier circuit. Since such an arrangement combines the function of rectifying an alternating current signal with the function or operation of receiving the electromagnetic energy that produces the rectified alternating current signal, a combined antenna-rectifier unit is often referred to as a rectenna and the two terms are utilized interchangeably hereinafter.

In view of the above discussion of the satellite power distribution system of FIG. 1, those of ordinary skill in the art will recognize that the electromagnetic field intensity and hence the power density is not constant throughout irradiated region 26. In this regard, because of the divergence of the beam-like antenna pattern associated with satellite transmitting antenna array 20 and other factors, the power density is generally highest within the central portion of the irradiated region 26 and diminishes with increasing distance from the center of the antenna footprint. For example, when the irradiated region 26 encompasses several tens of square miles, the power density at a position near the outer periphery of the irradiated region 26 can be 10 or more decibels (dB) below the level measured in the centermost portion of the irradiated region 26. Because of this disparity in power density, prior art rectenna arrangements do not operate efficiently within a system such as the satellite power distribution system depicted in FIG. 1. More specifically, in the previously proposed arrangements for transmitting power between two remote locations wherein energy is transmitted as a high frequency electromagnetic wave that is received and rectified, the rectenna units have comprised an array of antenna elements wherein a specific number of antennas are connected to a diode rectifier. In this regard, the most common approach is to utilize a half-wave (resonant) dipole as the antenna element with a semiconductor rectifier being physically and electrically interconnected at or near the inner ends of the two antenna arms that constitute each dipole element. Since the RF-to-DC conversion efficiency of a semiconductor rectifier is directly proportional to the power level at which it operates and is subject to various related operational constraints such as maximum power dissipation and reverse voltage rating, prior art rectenna arrangements of the abovementioned type will not operate efficiently in the system of FIG. 1. In particular, if such a rectenna is designed for optimal operation at or near the center of irradiated region 26, an identical rectenna that is positioned at or near the boundary region of irradiated region 26 will exhibit poor RF-to-DC conversion efficiency. On the other hand, if a antenna-rectifier arrangement that is configured for high efficiency operation when positioned near the outer boundary of irradiated region 26 is operated near the center of region 26, the thermal rating and/or reverse breakdown voltage rating of the associated semiconductor rectifier can be exeeded thereby causing failure of the rectenna unit.

Figure 2:
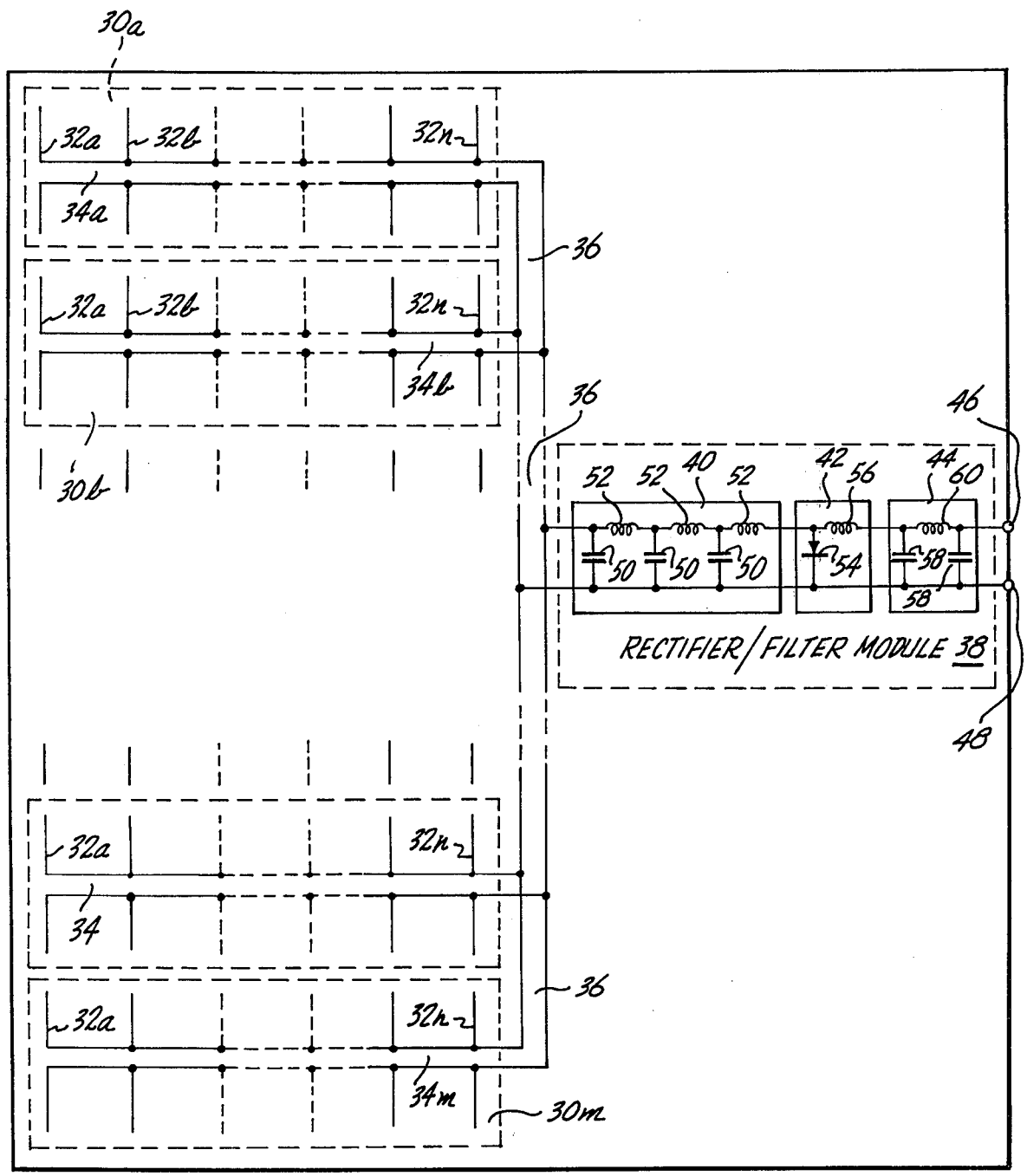
FIG. 2 is a block diagram illustrating the arrangement of an antenna-rectifier module configured in accordance with this invention.
Figure 3:
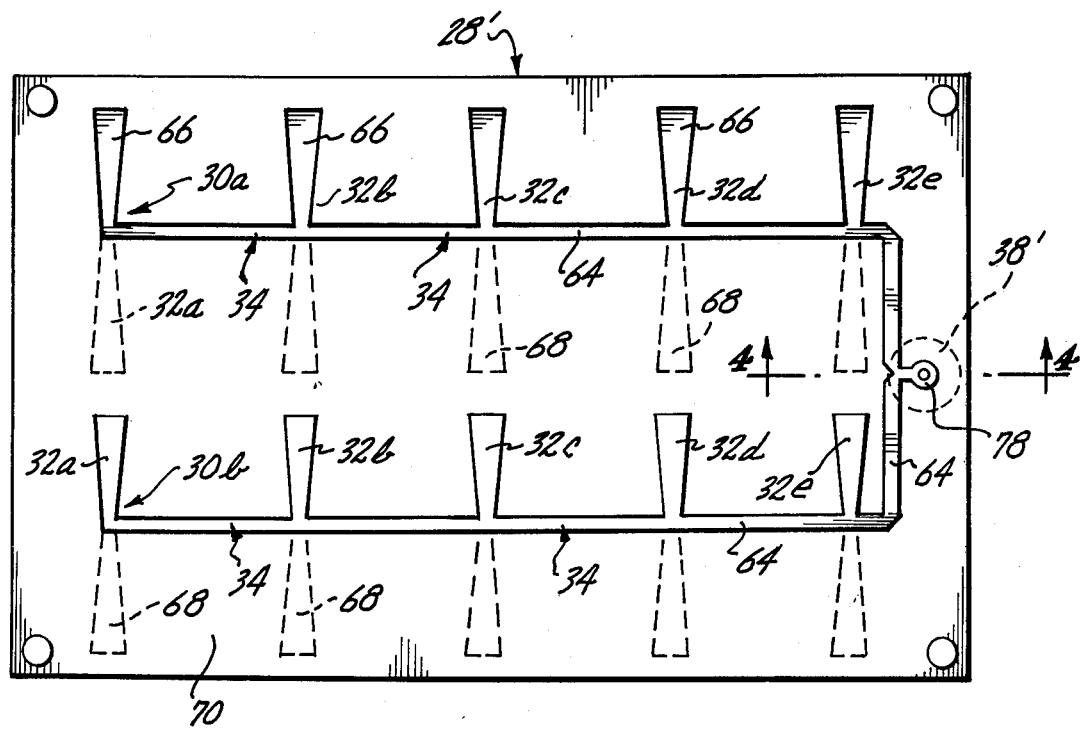
FIG. 3 is a partial plan view of an antenna-rectifier module constructed in accordance with the invention.
Figure 4:
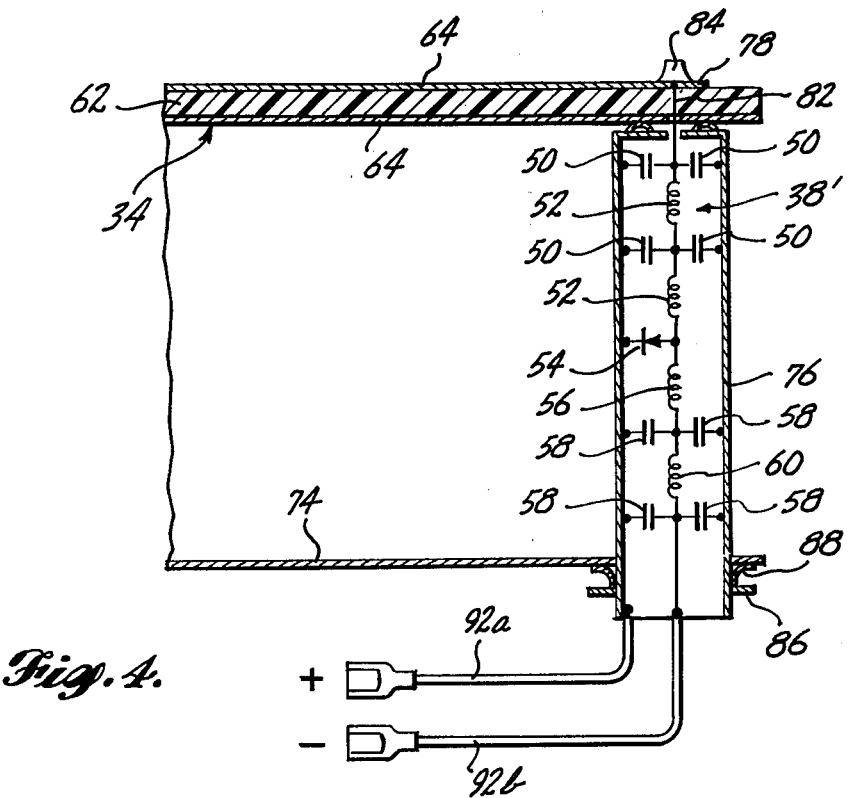
FIG. 4 is a cross-sectional elevation view further depicting the antenna-rectifier module of FIG. 3 and taken along the lines 4—4 thereof.

As is diagrammatically indicated in FIG. 1 and as shall be described in more detail relative to FIGS. 2 through 4, rectenna modules 28 of the present invention are configured to exhibit a receive aperture that is a function of the location of that particular rectenna module within the interconnected array of modules. Thus, in accordance with the invention, the aperture of each rectenna module 28a that is located near the outer periphery of the irradiated region 26 is substantially larger than the aperture of rectenna modules 28b that are located within the centermost portion of irradiated region 26. Although various arrangements can be utilized, satisfactory results can usually be attained by subdividing irradiated region 26 into a central zone that is substantially circular in geometry and a plurality of concentric, substantially annular regions which surround the central region. Rectenna modules having predetermined receive apertures configured for supplying a desired electrical power level are utilized in each of the individual zones. In this regard, although the pictorial representation of FIG. 1 would indicate otherwise, each rectenna module 28 is relatively small in comparison to the area of the irradiated region 26 or the area of any annular or circular subdivision of the irradiated region that is to be occupied by a single type of rectenna unit. Thus, it is generally possible to arrange the rectenna units into the above-discussed circular and annular zones while still maintaining a close packed geometry to thereby provide an overall receive aperture substantially commensurate with the irradiated region 26 even though the physical area of the rectenna modules 28 vary in proportion to the receive aperture exhibited.

Regardless of the geometry of the array employing the rectennas 28, each rectenna 28 of this invention includes a rectifier-filter circuit for converting the received high frequency signal to a direct current signal while simultaneously eliminating or reducing both undesired ripple in the DC output signal and reradiation of a high frequency signal by the rectenna modules 28. More specifically, as is schematically illustrated in FIG. 2, each rectenna module 28 includes one or more array segment 30 wherein each array segment 30a, 30b,-, 30m includes a plurality of dipole antenna elements 32a, 32b, 32c,-, 32n that are spaced apart along a two-wire (TEM) transmission line 34. In this arrangement the dipole antenna elements 32a, 32b,-, 32n are separated from one another by a distance equal to one wavelength relative to the propagation velocity within the associated transmission line 34. Thus, the electrical signals provided by, for example, dipole antenna elements 32a–32n of array segment 30a are coupled into transmission line 34a in phase with one another. Thus, the power level of the electromagnetic signal at the terminus of the array segment 30a is substantially equal to $nP_n$ where n is the number of dipole antenna elements 32 in the array segment 30a and $P_n$ is the incremental power provided by each dipole antenna element 32 within array segment 30a. As is illustrated in FIG. 2, when a plurality of array segments 30a, 30b,-, 30m are utilized to provide a desired receive aperture, the array segments 30a–30m are interconnected by sections of transmission line 36 that are similar to the transmission line 34. Thus, in a rectenna module 28 employing m array segments 30, (m−1) segments of transmission line 34 are necessary with the length of each transmission line segment 36 being established to combine the signals supplied by each array segment 30 in an additive (in phase) manner. As shall be described in more detail, the geometry of the dipole antenna elements 32a, 32b,-, 32n and the number of elements within the array is established to maintain a proper impedance level at the input rectifier-filter module 38.

As is schematically illustrated in FIG. 2, rectifier-filter module 38 is connected for receiving the signal provided by the array segments 30a–30m. In this regard, whenever the rectenna module 28 includes two or more array segments 30 it is usually advantageous to interconnect rectifier-filter module 38 to the section of transmission line 36 that interconnects substantially equal numbered groups of array segments 30 to thereby minimize the current density within the various sections of transmission line 36. For example, in an embodiment wherein the rectenna module 28 includes five array segments 30a, 30b-, 30e rectifier-filter module 38 is typically connected at the junction between transmission line segments 34b and 34c, i.e., at the interconnection of array segment 30c with the remaining array segments. On the other hand, in the hereinafter described embodiment of FIGS. 3 and 4 wherein two array segments 30a and 30b are interconnected by a single transmission line segment 36a, the associated rectifier-filter module 38 connects to the interconnecting transmission line 36 at a point equidistant from the two array segments 30a and 30b.

Regardless of the transmission line arrangement that interconnects rectifier-filter module 38 with the arrayed dipole antenna elements 32, rectifier-filter module 38 includes a first low-pass filter 40, a rectifier stage 42, and a second low-pass filter 44 that are respectively connected in cascade with one another to supply a DC output signal to the rectenna output terminals 46 and 48. In the particular arrangement of FIG. 2, the low-pass filter 40 is a six element structure having three shunt legs that include a capacitor 50 and three series legs that include an inductor 52. Although identified by a single numeral, the capacitors 50 and the inductors 52 do not necessarily exhibit identical values of capacitance and inductance. Further, as will be recognized by those skilled in the art, various low-pass filter structure other than the depicted arrangement can be employed in place of the low-pass filter 40. In this regard, the important thing is that the filter 40 pass signals at the received microwave frequency with little or no attenuation while greatly attenuating any harmonically related signals that are generated by rectifier stage 42. More specifically, nonlinearities in the operating characteristics of semiconductor rectifiers such as those employed in the practice of the invention cause the generation of electrical signals that are harmonically related to the applied signal. Thus, it should be understood that low-pass filter 40 is utilized to stop electrical signals at frequencies higher than the received signal that are generated within the rectifier stage 42 from reaching dipole antenna elements 32 or from reaching the various antenna transmission lines (32a–32m, 36) and being radiated into the atmosphere. This is especially important in solar satellite systems of the type described relative to FIG. 1 wherein each rectenna module 28 operates at a relatively high power level and thus, in the absence of structure such as low-pass filter 40, is capable of producing a substantial electromagnetic field at higher, harmonically related frequencies.

In addition to preventing radiation of the harmonically related signals generated within rectifier stage 42, low-pass filter 40 is preferably configured and arranged to reflect the harmonic signals supplied by the rectifier stage so that the reflected energy exhibits a phase angle that causes at least a portion of the reflected signal to contribute to the rectification process and thus improve the RF-to-DC conversion efficiency of the overall rectifier-filter module 38.

Further, the low-pass filter 40 may also be used as an impedance matching section between the diode rectifier 42 and the impedance matching section between the diode rectifier 42 and the impedance presented by the array of n dipoles. (In this regard, the depicted low-pass filter 40 contains an even number of elements (six) which is often the case for a filter that simultaneously performs filtering and impedance transforming functions).

With continued reference to FIG. 2, rectifier stage 42 comprises a semiconductor diode 54 having its anode connected to the output terminal of low-pass filter 40 and the cathode thereof connected to circuit common (terminal 48). In addition, rectifier circuit 42 includes an inductor 56 that is connected between the anode of semiconductor rectifier 54 and the input terminal of the second low-pass filter 44. In this arrangement, inductor 56 is selected in view of the capacitance characteristic of semiconductor diode 54 and the input impedance of low-pass filter 44 (usually relatively low) so as to cause circuit resonance at the frequency of the received signal.

Low-pass filter 44 is arranged to filter the half-wave rectified signal provided by rectifier stage 42 to thereby prevent high frequency ripple in the DC signal supplied to terminal 46. Additionally, as noted above, the input impedance of the second low-pass filter 44 may be a factor in causing semiconductor diode 54 to exhibit resonance at the desired frequency. Like the first low-pass filter 40, various filter configurations are suitable for use as low-pass filter 44 with the arrangement depicted in FIG. 2 being a single stage pi network having shunt capacitors 58 and a series inductor 60.

To provide a satisfactory impedance match from the array segments 30 to rectifier-filter module 38, each of the dipole antenna elements 32a, 32b,–, 32n of FIG. 2 exhibits one wavelength resonance wherein the electrical length is selected slightly less than $\lambda$, where $\lambda$ denotes the free-space wavelength of the received electromagnetic energy. As is known by those skilled in the art, the impedance exhibited by each antiresonant dipole antenna element 32 can be established well in excess of 100 ohms and the impedance of the n antiresonant dipole within each array segment 30 of FIG. 2 exhibit a total impedance of $Z_d/n$, where $Z_d$ is the impedance of a single dipole antenna element 32a–32n. Thus, when m array segments 30a, 30b,–, 30m are interconnected through suitably arranged transmission line segments 36, the impedance presented at the input port of rectifier-filter module 38 is $Z_d/nm$. Thus, by suitably configuring dipole antenna elements 32, a total antenna impedance can be achieved which is either equal to or nearly equal to the impedance presented by the diode rectifier. In this regard, even if an exact impedance match cannot be attained, a relatively simple impedance transforming filter within the diode/filter module will provide the necessary additional impedance matching.

Those skilled in the art will recognize that the impedance of each dipole element 32 of FIG. 2 often places a practical limit on the number of elements that can be employed in an embodiment of the invention. More specifically, since the equivalent impedance of the entire collection of dipoles is $Z_d/nm$, and there are practical limits relative to the maximum impedance that can be attained for each dipole element, present fabrication techniques usually constrain the total number of dipole (nm) to approximately 10 or 12. For example, FIG. 3 and 4 depict a rectenna module 28' having two array segments 30a and 30b, each including five dipole antenna elements 32a, 32b,–32e. In this arrangement, the antenna elements 30 and the transmission line 34 between the spaced apart antenna elements are integrably formed on the surface of a dielectric substrate 62 through conventional printed circuit techniques. More specifically, in the arrangement of FIGS. 3 and 4, the transmission line 34 is a stripline structure formed by strips or ribbons of conductive material 64 that extend in alignment with one another along the opposite surfaces of dielectric substrate 62. As is known in the art, the characteristic impedance of the depicted type of microstrip transmission line is approximately $Z_{01} = 377s/w(\epsilon_{r1})^{-\frac{1}{2}}$, where w is the width of the conductive strip 64, s is the spacing between conductive strips 64 (i.e., the thickness of the dielectric substrate 62) and $\epsilon_{r1}$ denotes the relative dielectric constant of substrate 62.

Each dipole antenna element 30a,–, 30e of the embodiment of FIGS. 3 and 4 is a printed dipole that includes a first antenna arm 66 that extends substantially orthogonally from the conductive strip 64 that is formed on the upper surface 70 of dielectric substrate 62. The second antenna arm 68 of each dipole antenna element 32 is formed in a similar manner as a conductive region that extends orthogonally from the conductive strip 64 that is located on the lower surface of the dielectric substrate 62, with the two antenna arms 66 and 68 being substantially colinear. As was discussed relative to the embodiment of FIG. 2, the length of the dipole antenna elements 32a, 32b,-, 32e is greater than $\lambda/2$ and less than $\lambda$ where $\lambda$ is the free-space wavelength of the signal received from the solar satellite or other source of electromagnetic energy. To provide control over the impedance presented by each dipole antenna element 30a, 30b,-, the first and second antenna arms 66 and 68 are of increasing width relative to distance from the microstrip transmission line 34. As is known in the art, such a "bow tie" configuration can be utilized to reduce the antenna impedance by as much as a factor of 10. Thus, utilizing dipole antenna elements 32a, 32b-32e having an effective electrical length of one wavelength (i.e., antiresonant dipoles) provides a maximum antenna impedance on the order of several hundred ohms and configuring the antenna arms 66 and 68 of each antenna element in the above-described manner permits the system designer to establish the impedance of each antenna element at a desired value. In this regard, as previously discussed, the total impedance presented by the antenna elements in each embodiment of the invention is established substantially equal to the nominal impedance of the rectifier-filter circuit employed in a particular rectenna module. Thus, in the arrangement of FIGS. 3 and 4 wherein each array segment 30a and 30b includes five antenna elements, the impedance of each dipole antenna element 32a, 32b,-, 32e is established substantially equal to $10Z_r$, where $Z_r$ denotes the nominal impedance of the hereinafter described rectifier-filter module 38'. As noted previously, the input low-pass filter 40 within the rectifier-filter module 38 may be used to provide additional impedance transformation (either up or down as necessary). This provides additional design flexibility and allows the module 28' to be configured so that it includes the number of dipoles necessary to supply optimum power drive level to the associated rectifier 54.

To configure the rectenna module 28' for receiving electromagnetic energy from a single direction, i.e., energy that impinges on the upper surface 70 of the dielectric substrate 62, the arrangement of FIGS. 3 and 4 includes a conductive ground plane 74 that is spaced apart from the lower surface of dielectric substrate 62 by approximately one-quarter of an electrical wavelength. Thus, if the space between dielectric substrate 62 and the conductive ground plane 74 is filled with a nonconductive foam or other material having a dielectric constant not equal to that of air, the distance between ground plane 74 and the dielectric substrate 62 is $c/4f(\epsilon_{r2})^{-\frac{1}{2}}$, where c is the velocity of light, f is the frequency of the received electromagnetic energy and $\epsilon_{r2}$ is the relative dielectric constant of the material imposed between ground plane 74 and dielectric substrate 62.

As is further indicated in FIGS. 3 and 4, the rectifier-filter 38' of the depicted embodiment of the invention is, in effect, a separate module that is enclosed within a cylindrical conductive shell 76. More specifically, in the depicted arrangement the conductive strip 64a that forms one conductor of stripline segment 36' which interconnects the two arrays segments 30a and 30b includes a land region or circuit pad 78. A center conductor 82 that extends outwardly from one end of the conductive shell 76 that encloses rectifier-filter unit 38' is electrically connected to the circuit pad 78 to thereby connect the antenna arms 66 of each dipole 32a-32e to the rectifier-filter module 38'. Although the center conductor 82 can be connected to the pad 78 by soldering or other similar processes, a conventional plug-in or quick disconnect-type connector such as that indicated by the numeral 84 in FIG. 4 is preferably employed. To connect to the lower conductive strip 64b and hence antenna arms 68 to the rectifier-filter 38; the upper end surface of shell 76 includes spring contacts 77 which bear against a conductive pad region 78b that is formed integrally with the conductor 64b. As is further shown in FIG. 4, when installed to the rectenna module 28', the cylindrical conductive shell 76 extends downwardly from the lower surface of the dielectric substrate 62 and projects outwardly through a suitably sized opening in the conductive ground plane 74. If the shell 76 is to be electrically interconnected with ground plane 74, a flange 86, which projects outwardly from the cylindrical conductive shell 76, is equipped with a set of spring contacts 88 which bear against the ground plane 74. Output leads 92a and 92b are respectively connected to the conductive shell 76 and the output of the second low-pass filter described relative to the arrangement of FIG. 2.

Although FIG. 4 schematically illustrates the electrical components of rectifier-filter unit 38' in a manner equivalent to the schematic representation of FIG. 2, it should be understood that the electrical components utilized within rectifier-filter 38' are primarily lumped-circuit components as contrasted with distributed-parameter components. Thus, the illustrated capacitors may be conventional commercially available components or may be formed by dielectric discs that extend between elements such as the center conductor 82 and the interior surface of the cylindrical conductive shell 76. In a like manner, the necessary inductors and the semiconductor rectifier employed can be physically configured as a set of elements that are, in effect, slid into or stacked up within the conductive shell 76. Alternatively, the module inner structure may be partially or substantially fabricated using planar circuit technology using hybrid and/or monolithic integrated circuits.

In view of the foregoing description, those of ordinary skill in the art will recognize that variations in the details of the embodiments depicted herein may be made without departing the scope and spirit of the invention. For example, although the dipole antenna elements and transmission lines have been primarily discussed in terms of printed strip transmission line technology, various other arrangements can be utilized where the transmission lines and antennas are formed of conductive elements such as wires, bars or tubing.

The embodiments of the invention in which an exclusive property or privilege is claimed are defined as follows:

1. Apparatus for receiving electromagnetic energy and converting said electromagnetic energy to a DC signal wherein said electromagnetic energy irradiates a substantial spatial region and wherein the power density is nonuniform relative to said irradiated spatial region, said apparatus comprising a plurality of antenna-rectifier modules, each of said antenna-rectifier modules including a semiconductor rectifier that exhibits a nonlinear RF-DC rectification efficiency relative to the power level at which said semiconductor rectifier is operated, each of said antenna-rectifier modules further including a plurality of antenna elements connected for supplying an electrical signal to said semiconductor rectifier when the associated antenna-receiver module is positioned within said irradiated region for receiving said electromagnetic energy, the number of said antennas within each of said antenna-rectifier modules establishing the receiving aperture of that particular antenna-rectifier module to operate said semiconductor rectifier within that particular module at a preselected power level and efficiency, said plurality of antenna-rectifier modules being arrayed within at least a portion of said irradiated region with said receiving aperture of each said antenna-rectifier module being established in view of the power density of said electromagnetic energy at the location of that particular antenna-rectifier module to maintain said operation of said semiconductor rectifier at said desired power level.

2. The apparatus of claim 1 further including a two-conductor transmission line wherein each of said antenna elements are center-fed antiresonant dipoles spaced apart from one another and extending outwardly from the two conductors of said transmission line, each of said dipoles having an electrical length greater than $\lambda/2$, where $\lambda$ denotes the wavelength of said electromagnetic energy irradiating said spatial region, the distance between adjacent ones of said dipoles being established to couple the electrical signals supplied by said dipoles into said two-wire transmission line substantially in phase with the electrical signals provided by other ones of said dipoles and propagating along said two-wire transmission line.

3. The apparatus of claim 2 wherein each of said antenna-receiver modules further includes a dielectric substrate for supporting said two-wire transmission line and each of said dipoles wherein said two-wire transmission line is defined by conductive strips disposed in alignment with one another on opposite surfaces of said dielectric substrate and each of said center-fed dipoles is defined by a pair of colinear antenna arms, each of said antenna arms being a conductive strip extending outwardly from an associated one of said conductive strips defining said two-wire transmission line.

4. The apparatus of claims 1, 2 or 3 further including a first filter means electrically interconnected between said antenna elements and said semiconductor rectifier, said first filter means being configured and arranged for coupling electrical signals of a frequency substantially equal to the frequency of said electromagnetic energy irradiating said spatial region to said semiconductor rectifier and being configured and arranged for substantial attenuation of electrical energy at frequencies greater than said frequency of said electromagnetic energy irradiating said spatial region.

5. The apparatus of claim 4 wherein said first filter means is further configured and arranged to include impedance matching means for effecting an impedance transformation between said antenna elements and said semiconductor rectifier.

6. The apparatus of claim 5 wherein said impedance matching means of said first filter means exhibits an impedance to said semiconductor rectifier for reflecting electrical signals generated by said semiconductors rectifier at a frequency harmonically related to said frequency of said electromagnetic energy irradiating said spatial region to increase the current through said semiconductor diode and enhance rectification efficiency.

7. The apparatus of claim 4 further including second filter means electrically interconnected for receiving the signal supplied by said semiconductor rectifier, said second filtering means including means for substantially attenuating alternating current signals at frequencies equal to and above the frequency of said electromagnetic energy that irradiates said spatial region.

8. The apparatus of claim 7 wherein adjacent ones of said dipoles are electrically spaced apart by approximately one wavelength.

9. The apparatus of claim 8 wherein the length of each of said dipole elements is established for antiresonance at the frequency of said electromagnetic energy irradiating said spatial region and wherein the width of each antenna arm of said pair of antenna arms defining each said dipole varies along the length of said antenna arm to establish the impedance of each said antenna arm substantially equal to $Z_d$, where $Z_d$ is a predetermined value substantially equal to the product of the number of dipoles within that particular antenna-rectifier module and the impedance collectively presented by said semiconductor rectifier and said first and second filterming means.

10. The apparatus of claim 9 wherein each of said antenna-rectifier modules includes a conductive ground plane supported in parallel spaced apart relationship with said dielectric substrate at a distance that at least approximately corresponds to $\lambda/4$, where $\lambda$ is the wavelength of said electromagnetic energy irradiating said spatial region, each of said antenna-rectifier modules further including a conductive housing for containing and shielding said semiconductor rectifier and said first and second filtering means, said conductive housing being removably installed between said conductive ground plane and said dielectric substrate and being electrically interconnected for receiving the signal by said dipoles and for supplying said direct current signal supplied by said rectifier means.

11. A rectenna for use at a selected location in a high frequency electromagnetic field of predetermined frequency that impinges on a predetermined spatial region and exhibits nonuniform power density over said spatial region, said rectenna comprising:
 a rectifier including a semiconductor device for rectifying electrical signals of a frequency corresponding to said predetermined frequency of said electromagnetic field, said semiconductor device exhibiting a rectification efficiency that varies according to the power level at which that semiconductor device is operated, said semiconductor device further exhibiting a desired range of power levels relative to said rectification efficiency;
 at least two array segments, each of said array segments including a two-conductor transmission line and a plurality of dipole antenna elements positioned with a predetermined spacing along said two-conductor transmission lines; and
 electrical connection means for interconnecting said semiconductor device with said two-conductor transmission line of each said array segment to provide said semiconductor device with the electrical signal applied by each said dipole element, the number of said array segments and the number of said dipole elements with each said array segment being established to effect a predetermined receive aperture, said predetermined receive aperture being selected in view of the power density of said electromagnetic field at said selected location of said spatial region to maintain said semiconductor device within said desired range of power levels.

12. The rectenna of claim 11 wherein each of said dipole elements exhibits an electrical length greater than $\lambda/2$ and less than $\lambda$, where $\lambda$ is the wavelength associated with said high frequency electromagnetic field, each said dipole element being configured and arranged to establish the impedance of each said dipole element at a predetermined value that is substantially equal to $nZ_r$, where n is equal to the product of the number of said array segments times the number of dipole elements within each said array segment and $Z_r$ denotes the nominal impedance of said rectifier circuit.

13. The rectenna of claim 12 wherein each said dipole element includes a pair of colinear antenna arms with each said antenna arm of each said pair of antenna arms extending outwardly from a different one of the conductors within said two-conductors transmission line.

14. The rectenna of claim 13 wherein each of said antenna arms is formed of a conductive strip material and each said antenna arm increases in width relative to the distance from said two-conductor transmission line to establish the impedance of each said antenna element approximately equal to said value $nZ_r$.

15. The rectenna of claims 11, 12, 13 or 14 wherein said rectifier circuit includes first and second filtering means, said first filtering means being connected for receiving the electrical signals supplied by each said array segment and being connected for supplying a signal of said semiconductor device, said first filtering means being configured and arranged to exhibit relatively little attenuation relative to signals of a frequency corresponding to said predetermined frequency of said electromagnetic field and to exhibit substantial attenuation of signals that are harmonically related to and greater than said predetermined frequency of said electromagnetic field, said second filtering means being connected for receiving the signal supplied by said semiconductor device and for substantially attenuating alternating current signal components within the rectified signal supplied by said semiconductor device.

16. The rectenna of claim 15 wherein said first filtering means is further configured and arranged to include impedance matching means for effecting an impedance match between said array segments and said semiconductor device for rectifying electrical signals.

17. The rectenna of claim 15 further comprising a sheet of dielectric material for supporting said two-conductor transmission line and said plurality of dipole elements, each of said two-conductor transmission lines being defined by conductive strips disposed in alignment with one another on opposite surfaces of said dielectric sheet with the antenna arms of each said dipole antenna element extending outwardly from the conductive strips of said two-conductor transmission line and along a surface of said dielectric sheet, each pair of said antenna arms defining one of said dipole elements and being disposed on opposite surfaces of said dielectric substrate, said rectenna further comprising a conductive ground plane spaced apart from one surface of said dielectric sheet by approximately $\lambda/4$, where $\lambda$ represents the wavelength of an electrical signal having a frequency corresponding to said predetermined frequency of said electromagnetic field when propagating within a media having a dielectric constant corresponding to that material between said dielectric sheet and said ground plane.

18. The rectenna of claim 17 further comprising a housing for enclosing and electromagnetically shielding said semiconductor rectification device and said first and second filtering means, said housing including contact means for electrically interconnecting said first filter means with said array segments and including means for coupling the direct current signal supplied by said second filtering means to a utilization device, said housing means being removably installed between said dielectric substrate and said ground plane with said housing means in electrical contact with said ground plane.

* * * * *

UNITED STATES PATENT AND TRADEMARK OFFICE
CERTIFICATE OF CORRECTION

PATENT NO. : 4,360,741

DATED : November 23, 1982

INVENTOR(S) : Fitzsimmons et al.

It is certified that error appears in the above—identified patent and that said Letters Patent is hereby corrected as shown below:

Column 10, line 43, "FIG." should be --FIGS.--

Column 12, line 48, insert --from-- after "departing"

Column 14, line 36, insert --supplied-- before "by"

line 44, insert --circuit-- before "including"

line 62, "applied" should be --supplied--

Column 15, line 32, "of" should be --to--

Column 16, line 10, "line" should be --lines--

Signed and Sealed this

Nineteenth Day of July 1983

[SEAL]

Attest:

GERALD J. MOSSINGHOFF

Attesting Officer     Commissioner of Patents and Trademarks